United States Patent [19]

Sawicki et al.

[11] 3,992,293

[45] Nov. 16, 1976

[54] METHOD OF FILTERING LIQUIDS CONTAINING DISSOLVED CARBON DIOXIDE

[75] Inventors: John E. Sawicki, Milwaukee; James P. Murdock, New Berlin, both of Wis.

[73] Assignee: Jos. Schlitz Brewing Company, Milwaukee, Wis.

[22] Filed: Mar. 24, 1975

[21] Appl. No.: 561,046

[52] U.S. Cl. .................................. 210/48; 210/57; 210/59; 210/65; 55/87; 426/329; 423/225; 423/234; 195/107
[51] Int. Cl.² ...................... B01D 37/00; C02D 1/00
[58] Field of Search .................... 210/59, 42, 45–53, 210/57, 65, 218; 195/107; 426/329; 252/321; 55/87; 423/225, 234, 421; 156/DIG. 4

[56] References Cited
UNITED STATES PATENTS

| | | | |
|---|---|---|---|
| 2,761,755 | 9/1956 | Brown | 423/234 |
| 2,823,125 | 2/1958 | Schwaiger | 195/107 |
| 2,877,101 | 3/1959 | Rector | 423/234 |
| 2,955,910 | 10/1960 | Findlay | 423/234 |
| 3,193,395 | 7/1965 | Tabler | 426/329 |
| 3,304,151 | 2/1967 | Gaiser | 423/234 |
| 3,833,464 | 9/1974 | Rolfe | 210/51 |
| 3,859,213 | 1/1975 | Hunt | 210/65 |

*Primary Examiner*—Thomas G. Wyse
*Assistant Examiner*—Ernest G. Therkorn
*Attorney, Agent, or Firm*—Andrus, Sceales, Starke & Sawall

[57] ABSTRACT

A method of reducing foaming of a liquid containing dissolved carbon dioxide during filtering. The carbonated liquid to be filtered is adjusted in pH to a value of 6.5 to 8.0 by the addition of an alkaline material which reacts with the dissolved carbon dioxide to remove the carbon dioxide from solution. The elimination of the dissolved carbon dioxide results in decreasing foaming during filtering and substantially increases the rate of filtration.

3 Claims, 2 Drawing Figures

3,992,293

METHOD OF FILTERING LIQUIDS CONTAINING DISSOLVED CARBON DIOXIDE

BACKGROUND OF THE INVENTION

In the normal brewing process there are a number of different liquid residues or effluents resulting from the various operations in the overall process. The liquid residues generally contain a small proportion of dissolved solids, and a small amount of suspended solids, primarily filter aid materials, as well as dissolved carbon dioxide.

In the past, the practice has merely been to discard the liquid residue, but due to pollution considerations, the recent practice has been to treat the liquid residue and remove protenaceous constituents. In the removal treatment, the liquid is initially filtered to remove the suspended solids, and the filtrate is then evaporated. Due to the high concentration of protenaceous material, the concentrated filtrates can be used as a livestock feed. The solids removed by filtration are normally transported to a landfill site and discarded.

When using vacuum filtration equipment to filter the liquid residue or effluent, tremendous quantities of foam are generated due to the dissolved carbon dioxide. It has been found that because of the reduction of pressure during filtration, the carbon dioxide comes out of solution and carbon dioxide bubbles are adsorbed on the filter aid particles or other suspended foreign particles. The carbon dioxide bubbles continue to grow during the filtering operation and cannot be displaced, with the result that the porosity and permeability of the filter are substantially reduced, thereby substantially reducing the rate of filtration.

As a result of the dissolved carbon dioxide, a problem is also encountered in subsequent evaporation of the filtrate. During evaporation the carbon dioxide will come out of solution so that a substantial head of foam is generated in the evaporation vessel. If the foam generation is not controlled, the foam can overflow the vessel or back up into the other equipment.

SUMMARY OF THE INVENTION

The invention is directed to a method of reducing foam generation during processing of a carbonated liquid, and in particular, is directed to a method of preventing foaming of residual liquids from brewing processing during vacuum filtration. The liquid to be filtered comprises a mixture of different liquid residues or effluents from the brewing process, and the liquid will generally contain about 1% to 2% by weight of suspended solids, about 2% to 3% by weight of dissolved solids, and approximately one-half volume of carbon dioxide per volume of liquid. The pH of the liquid is normally below 5.0 and generally in the range of about 3.8 to 4.5.

In accordance with the invention, a water soluble alkaline material, such as an alkali metal hydroxide, is added to the liquid in sufficient quantity to raise the pH to a value in the range of 6.5 to 8.0. The alkaline material will react with the dissolved carbon dioxide to form carbonates. The elimination of the dissolved carbon dioxide substantially decreases foam generation during the vacuum filtration of the liquid and increases the rate of filtration. By eliminating the dissolved carbon dioxide, foam generation will also be substantially decreased in subsequent processing operations such as evaporation of the filtrate.

While foam generation is not a significant problem in pressure filtering operations, it has been found that the method of the invention, when used in pressure filtering operations, produces a substantial improvement in the rate of filtration.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

Figure 1:
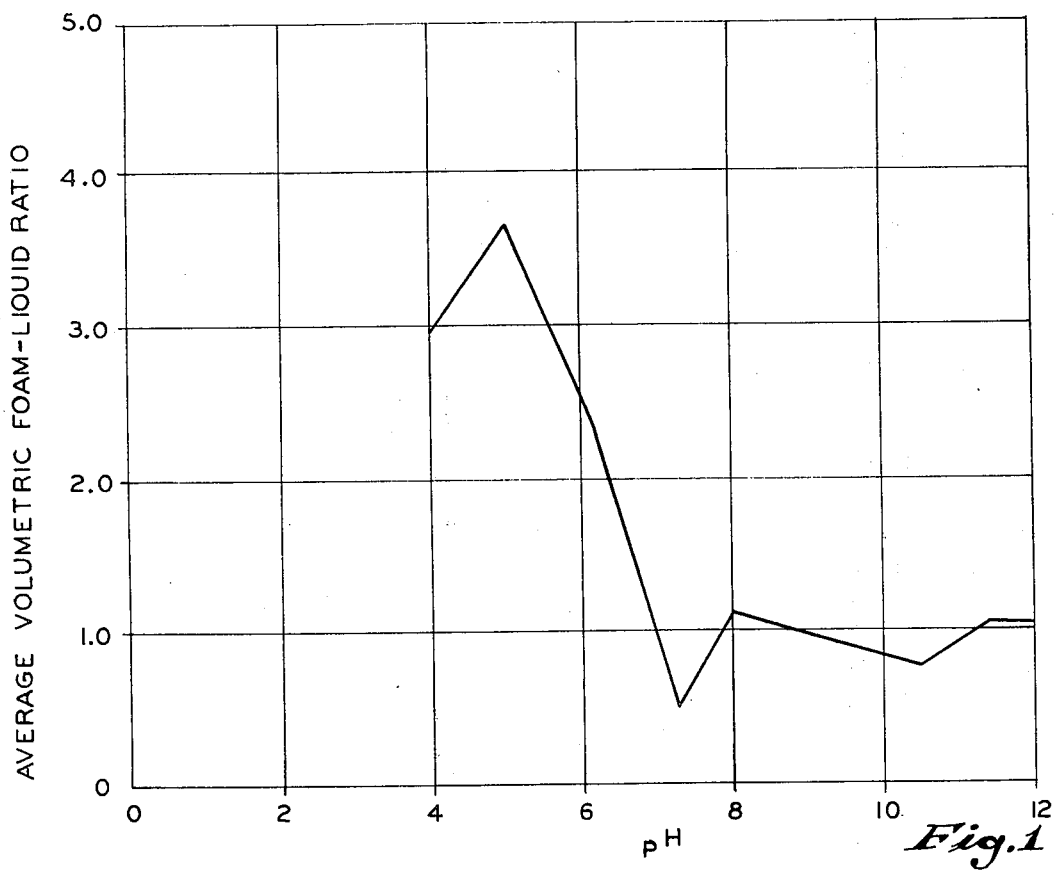
FIG. 1 is a curve showing the relationship between foam generation and pH of prefiltered beer.

The normal brewing process produces a number of different liquid residues or effluents. These residues, for example, are the fermentation effluent, the ruh stump effluent, the prefilter heel effluent, the final filter heel effluent, the pre-filter surge tank effluent, the pre-filter accumulator tank effluent, the final filter surge effluent, the final filter accumulator effluent, the government cellar tank effluent, the celler transfer beer and packaging waste beer.

The various residual liquids or effluents are combined, and the liquid mixture, in general, contains from 1% to 2% by weight of suspended solids, which are primarily filter aid materials, about 2% to 3% by weight of dissolved solids, and approximately one-half volume of carbon dioxide per volume of liquid. The liquid normally has a pH under 5.0 and usually in the range of 3.8 to 4.5.

According to the invention, an alkaline material is added to the liquid mixture prior to filtration in an amount sufficient to raise the pH of the liquid to a value in the range of 6.5 to 8.0. The alkaline material should be water soluble and can take the form of materials such as alkali metal hydroxides, i.e. sodium hydroxide, potassium hydroxide, or lithium hydroxide; ammonium hydroxide; or ammonium pyrophosphate. The alkaline material reacts with the dissolved carbon dioxide to remove the carbon dioxide from solution. It is preferred that the alkaline material contain metal ions that will form water soluble carbonates on reaction with the carbon dioxide, but if the alkaline material contains metal ions that form insoluble carbonates, the insoluble carbonates will be removed during the subsequent filtering operation.

After the addition of the alkaline material to raise the pH of the liquid to the aforementioned range, the liquid is filtered by a conventional vacuum type filter, such as a leaf filter, rotary drum filter, belt filter, Buchner filter, or the like.

It has been found that dissolved carbon dioxide produces tremendous quantities of foam during the vacuum filtration. The reduction in pressure during the vacuum filtration will result in the carbon dioxide coming out of solution, and carbon dioxide gas bubbles will be adsorbed on the suspended particles, such as filter aid particles and other suspended solids. The adsorbed carbon dioxide bubbles will progressively grow in size and are difficult to displace. This phenomenon greatly decreases the porosity and permeability of the filter and substantially reduces the rate of filterion. However, by the addition of the alkaline material, in accordance with the method of the invention, the dissolved carbon dioxide is eliminated and foam generation resulting from dissolution of the carbon dioxide during vacuum filtration is correspondingly eliminated.

Some foaming due to the agitation of the liquid may still exist, but foaming due to mechanical agitation will not adversely effect the rate of filtration.

The amount of the alkaline material to be added should preferably be sufficient to remove all of the dissolved carbon dioxide, and a pH in the treated liquid of over 6.5 indicates the substantial removal of the dissolved carbon dioxide. On the other hand, if the pH of the liquid is over 8.0, proteinaceous materials may be precipitated which can adversely effect the filtering operation.

If a pressure type of filter operation is employed in which a positive pressure is applied to the liquid during filtration in excess of about 10 psig, the carbon dioxide will be maintained in solution and no foaming due to the dissolution of carbon dioxide will result. However, it has been found that even with pressure filtering there is a correlation between the amount of carbon dioxide in solution and the rate of filtration, i.e. as the quantity of dissolved carbon dioxide is increased, the rate of filtration will be decreased. Thus, the removal of carbon dioxide from solution will increase the rate of filtration both in vacuum and pressure type filtering processes.

As a further advantage, the removal of the carbon dioxide aids in subsequent processing of the liquid. For example, after filtration, the filtrate, due to the high concentration of proteinaceous materials in the dissolved solids, is normally evaporated or concentrated and the concentrate used as a livestock feed. During evaporation, the presence of dissolved carbon dioxide will also result in substantial generation of foam which can overflow the evaporation vessel and back up into other equipment unless precautionary measures are taken. By removal of the carbon dioxide, the foam generation is substantially eliminated during subsequent processing, such as evaporation.

The following examples illustrate the process of the invention:

EXAMPLE I

A series of tests were conducted to show the relationship between the pH and foam generation of prefiltered beer. The prefiltered beer contained about 1 volume of carbon dioxide per volume of beer, a substantially greater proportion of carbon dioxide than in the residual brewing effluents, which is normally about ½ the volume of carbon dioxide per volume of liquid. In these tests, a series of samples of the pre-filtered beer were treated with different amounts of sodium hydroxide to provide pH's in the range of 4.0 to 12.0. Each of the samples was then filtered with a vacuum, precoated, leaf filter using diamataceous earth as the filter aid and a vacuum of 24 inches of mercury. An average of ten readings were used for each sample. During the filtration, the volumetric foam-liquid ratio was determined by use of a calibrated filtration collection tube.

The results of the tests showing the foam generation at various pH are illustrated in FIG. 1. As shown in the curve in FIG. 1, the foam-liquid ratio increased sharply as the pH was raised from 4.0 to 5.0 and then abruptly decreased to a minimum foam-liquid ratio at a pH of about 7.2. The foam generation increased slightly at a pH of 8.0 and then remained fairly constant at pH from 8.0 to 12.0. These tests illustrate the unusual drop in foam generation during vacuum filtering brought about by the raising of the pH through use of the alkaline material to a value in the range of about 6.5 to 8.0.

EXAMPLE II

A series of tests were conducted to compare the filtration rate of a liquid containing dissolved carbon dioxide at various pH values. Pre-filtered beer was employed in these tests and contained approximately 1 volume of carbon dioxide per volume of beer. A series of samples of pre-filtered beer were treated with sodium hydroxide in amounts sufficient to provide the various samples with pH's ranging from 4.0 to 12.0. Each of the samples was filtered through a vacuum leaf filter precoated with diatamaceous earth as the filter aid. A vacuum of 24 inches of mercury was utilized. An average of 10 readings were used for each sample.

Figure 2:
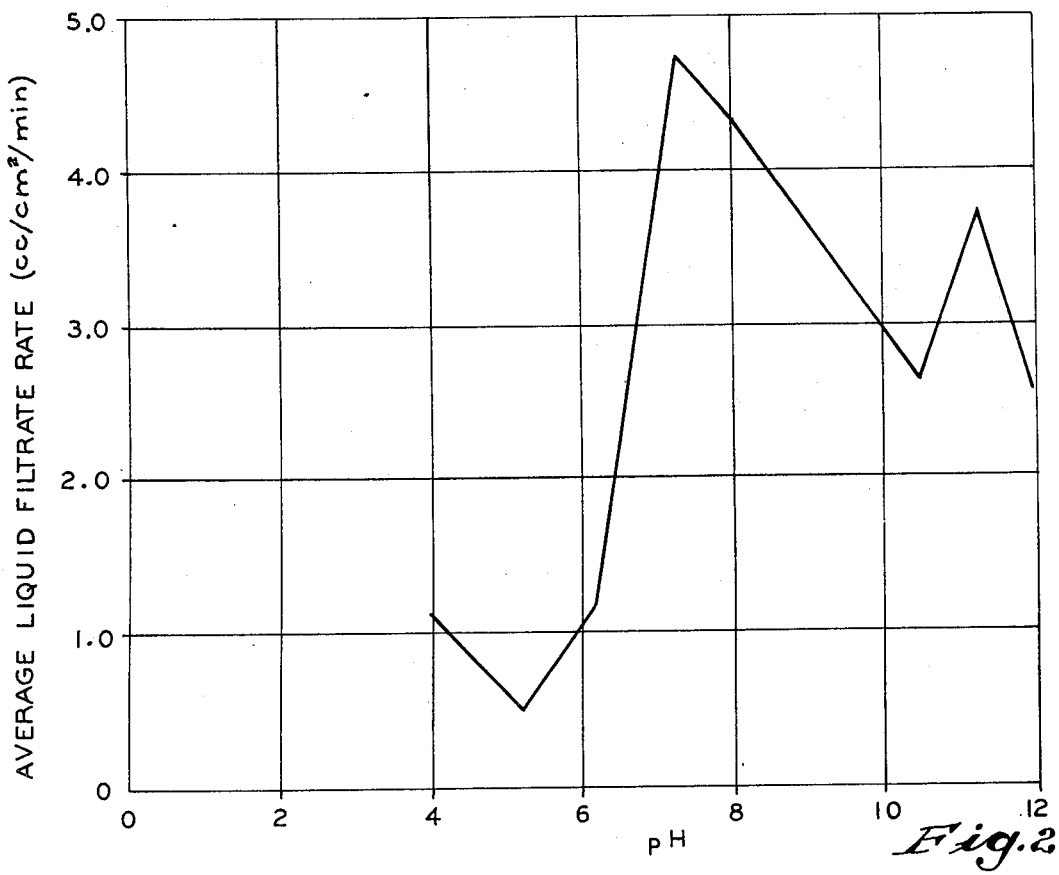
FIG. 2 is a curve showing the relation between the rate of filtration and pH for prefiltered beer.

The results of the tests comparing the filtration rate with pH are shown in FIG. 2. As illustrated in the curve, the filtration rate initially decreased as the pH was raised from 4.0 to 5.0 and then sharply increased to a maximum filtration rate at a pH of 7.2. The filtration rate then decreased as the pH was increased to a value of 10.5.

The curve of FIG. 2 illustrates the unusual and unexpected change in the filtration rate brought about by a change in pH and illustrates that the maximum filtration rate is obtained at a pH of about 7.0.

The method of the invention provides a substantial decrease in the generation of foam during vacuum filtration of carbonated liquids, as well as providing an improved filtration rate. While the invention has particular application to a vacuum filtering operation, it can also be employed with pressure filtering operations in which case the method of the invention will act to increase the filtration rate, although foam generation under pressure conditions is not a problem.

Various modes of carrying out the invention are contemplated as being within the scope of the following claims particularly pointing out and distinctly claiming the subject matter which is regarded as the invention.

We claim:

1. A method of filtering effluent from a brewing process, comprising the steps of collecting residual aqueous effluent from a brewing process, said effluent containing suspended solids, dissolved solids and dissolved carbon dioxide and having a pH less than 5.0, adding a water soluble alkaline material selected from the group consisting of alkali metal hydroxides, ammonium hydroxide and ammonium pyrophosphate, to said collected effluent to increase the pH to the range of 6.5 to 8.0, said alkaline material reacting with said carbon dioxide to substantially remove the carbon dioxide from solution, and thereafter filtering said collected effluent to remove the suspended solids, the removal of carbon dioxide decreasing foam generation during filtration and substantially increasing the rate of filtration.

2. The method of claim 1, wherein the effluent contains about 1% to 2% by weight of suspended solids and about 2% to 3% by weight of dissolved solids.

3. The method of claim 1, wherein the step of filtering is carried out under sub-atmospheric pressure.

* * * * *